US012663599B2

(12) United States Patent
Nguyen

(10) Patent No.: US 12,663,599 B2
(45) Date of Patent: Jun. 23, 2026

(54) DUAL DUPLEX BELLY-TO-BELLY LITTLE CONNECTOR (BBLC) BASED OPTICAL CONNECTORS

(71) Applicant: II-VI Delaware, Inc., Wilmington, DE (US)

(72) Inventor: Long Nguyen, San Jose, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 192 days.

(21) Appl. No.: 18/109,498

(22) Filed: Feb. 14, 2023

(65) Prior Publication Data

US 2024/0272390 A1     Aug. 15, 2024

(51) Int. Cl.
*H04B 10/00* (2013.01)
*G02B 6/42* (2006.01)

(52) U.S. Cl.
CPC ......... *G02B 6/4284* (2013.01); *G02B 6/4251* (2013.01); *G02B 6/4269* (2013.01); *G02B 6/4277* (2013.01)

(58) Field of Classification Search
CPC .. G02B 6/4284; G02B 6/4251; G02B 6/4269; G02B 6/4277; G02B 6/3897; G02B 6/4246; G02B 6/4292; G02B 6/424; G02B 6/389; H01R 13/6588
See application file for complete search history.

(56) References Cited

U.S. PATENT DOCUMENTS

| | | | | |
|---|---|---|---|---|
| 9,383,529 B1 * | 7/2016 | Yashar | ............... | G02B 6/4292 |
| 10,107,968 B2 * | 10/2018 | Tong | ...................... | G02B 6/389 |
| 2003/0171022 A1 * | 9/2003 | Distad | .................. | G02B 6/4261 |
| | | | | 439/372 |
| 2005/0117854 A1 * | 6/2005 | Chiu | .................... | G02B 6/3825 |
| | | | | 385/92 |
| 2007/0117458 A1 * | 5/2007 | Winker | ............... | G02B 6/4201 |
| | | | | 439/607.01 |
| 2007/0237466 A1 * | 10/2007 | Togami | ................ | G02B 6/4219 |
| | | | | 385/92 |
| 2007/0280604 A1 * | 12/2007 | Jablonski | ............. | G02B 6/4284 |
| | | | | 385/92 |
| 2008/0145002 A1 | 6/2008 | Ice | | |
| 2012/0148201 A1 * | 6/2012 | Kondou | ................ | G02B 6/428 |
| | | | | 385/92 |
| 2013/0071072 A1 * | 3/2013 | Xie | ...................... | G02B 6/4292 |
| | | | | 385/92 |
| 2016/0306122 A1 * | 10/2016 | Tong | ................... | G02B 6/3821 |
| 2021/0109297 A1 * | 4/2021 | Chen | ................... | G02B 6/3846 |
| 2024/0272390 A1 * | 8/2024 | Nguyen | ............... | G02B 6/4246 |

FOREIGN PATENT DOCUMENTS

EP          4418029          8/2024

OTHER PUBLICATIONS

European Search Report for Application No. 23183775, completed Nov. 23, 2023, 2 pages.

* cited by examiner

*Primary Examiner* — Agustin Bello
(74) *Attorney, Agent, or Firm* — McAndrews, Held & Malloy, Ltd.

(57)          ABSTRACT
Systems and methods are provided for dual duplex Belly-to-Belly Little Connector (BBLC) based optical connectors.

18 Claims, 4 Drawing Sheets

DUAL DUPLEX BELLY-TO-BELLY LITTLE CONNECTOR (BBLC) BASED OPTICAL CONNECTORS

TECHNICAL FIELD

Aspects of the present disclosure relate to optical communication based solutions. More specifically, certain implementations of the present disclosure relate to methods and systems for implementing and utilizing dual duplex Belly-to-Belly Little Connector (BBLC) based optical connectors.

BACKGROUND

Limitations and disadvantages of conventional and traditional devices and solutions for transmitting and receiving optical signals will become apparent to one of skill in the art, through comparison of such systems with some aspects of the present disclosure as set forth in the remainder of the present application with reference to the drawings.

BRIEF SUMMARY

System and methods are provided for dual duplex Belly-to-Belly Little Connector (BBLC) based optical connectors, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

The present disclosure is directed to optical communication based solutions. In particular, implementations based on the present disclosure pertain to optical connectors, and specifically to Belly-to-Belly Little Connector (BBLC) blocks for use in optical connectors to enhance operation and/or use thereof. In this regard, optical connector may typically incorporate optical receptacles, which may be driven by optical transceivers, for use in facilitating optical communication, particularly when the optical connectors are engaged (e.g., plugged into) optical ports. It is desirable to optimize the manner in which such optical receptacles are installed into the optical connector, particularly to reduce costs and/or increase flexibility of installation, without otherwise degrading operation of the optical connectors. Solutions based on the present disclosure achieve such desirable objectives, particularly by use of Belly-to-Belly Little Connector (BBLC) blocks which are designed and/or implemented to, e.g., reduce the cost of building the optical connectors, increase number of optical receptacles that may be incorporated into the optical connectors, and/or enhance the ease of installing and (optionally) replacing individual optical receptacles. In various example implementations, dual duplex Belly-to-Belly Little Connector (BBLC) blocks are used in particular. Example implementation(s) of such dual duplex Belly-to-Belly Little Connector (BBLC) block is illustrated in and described with respect to FIGS. 1-4 below.

Figure 1:
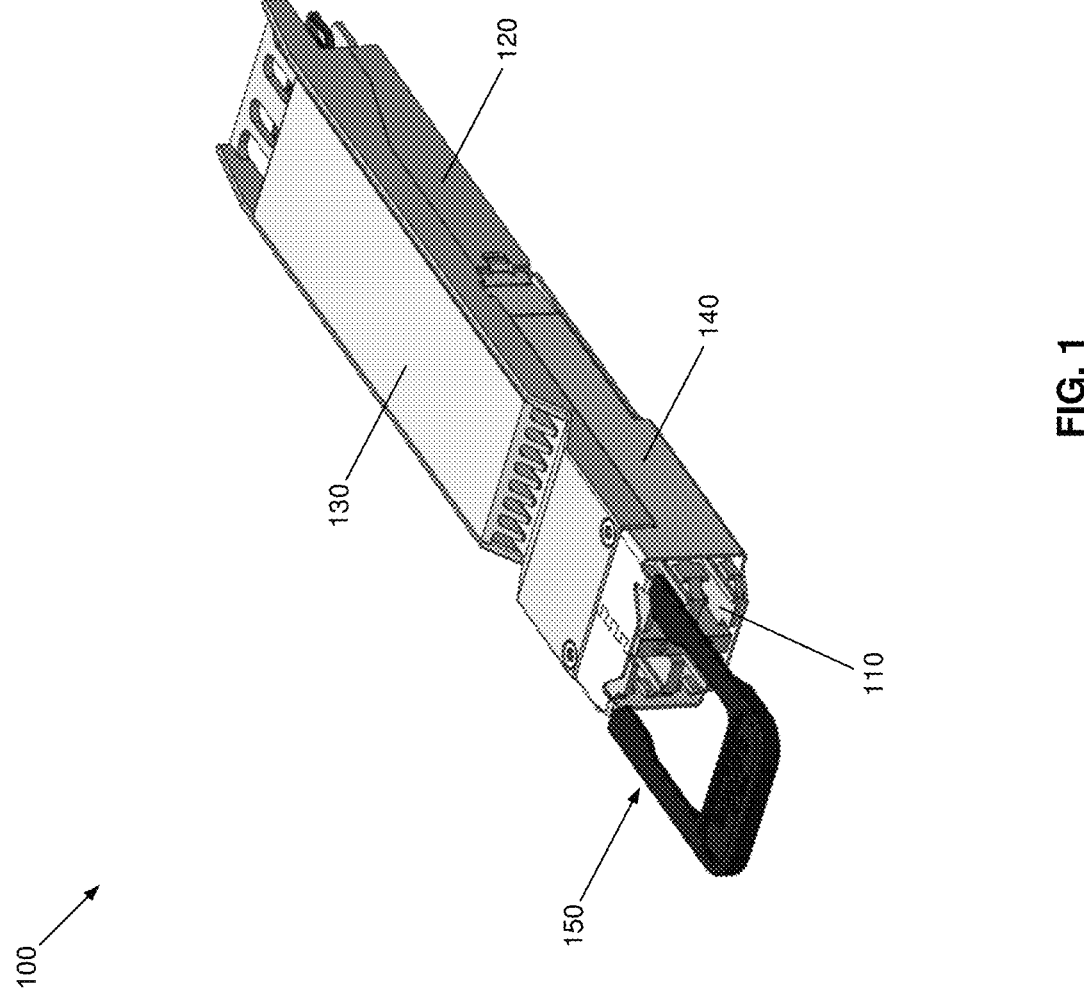
FIG. 1 illustrates an example optical connector with a dual duplex Belly-to-Belly Little Connector (BBLC) block, in accordance with the present disclosure.

FIG. 1 illustrates an example optical connector with a dual duplex Belly-to-Belly Little Connector (BBLC) block, in accordance with the present disclosure. Shown in FIG. 1 is an optical connector 100 (or portion thereof).

As shown in the example implementation illustrated in FIG. 1, the optical connector 100 comprises a housing 120 and a connector latch 140. The housing 120 is configured to house internal components of the optical connector 100, particularly the optical transceiver(s) and related circuitry, as well other circuitry and other components required for providing or facilitating optical based communication to/from the optical connector 100. Further, in some instances, the housing 120 may incorporate a heat sink 130, which is configured for dissipating heat generated by the internal components of the optical connector 100. The connector latch 140 is configured for engaging a corresponding optical port (e.g., plug-in port). To that end, the connector latch 140 may be specifically designed or implemented to physically fit and/or engage particular ports. Further, in some instances, the connector latch 140 may comprise or be coupled to a latch port tap 150, which would allow extraction of the optical connector from the port.

The optical connector 100 also comprises a dual duplex Belly-to-Belly Little Connector (BBLC) block 110, designed and implemented in accordance with the present disclosure. In this regard, the BBLC block 110 is configured to house one or more optical receptacles which are used to provide optical communication when the optical connector 100 is connected to (e.g., plugged into) corresponding optical port(s). The BBLC block 110 is specifically designed and implemented to optimize operation of the optical connector 100, particularly with respect to the number of optical receptacles and the manner in which these optical receptacles are installed, operated, and (optically) replaced, as described herein. As shown in FIG. 1 (and the remaining figures) the BBLC block 110 is configured for housing four (4) optical receptacles. Nonetheless, it should be readily understood that the disclosure is not limited to such implementation(s). The BBLC block 110 would be integrated into the optical connector 100, and once the optical receptacles are installed therein, these optical receptacles may be connected to the optical transceivers within the housing 120. The optical connector 100, and components thereof (particularly the BBLC block 110) are described in more detail below.

Figure 2:
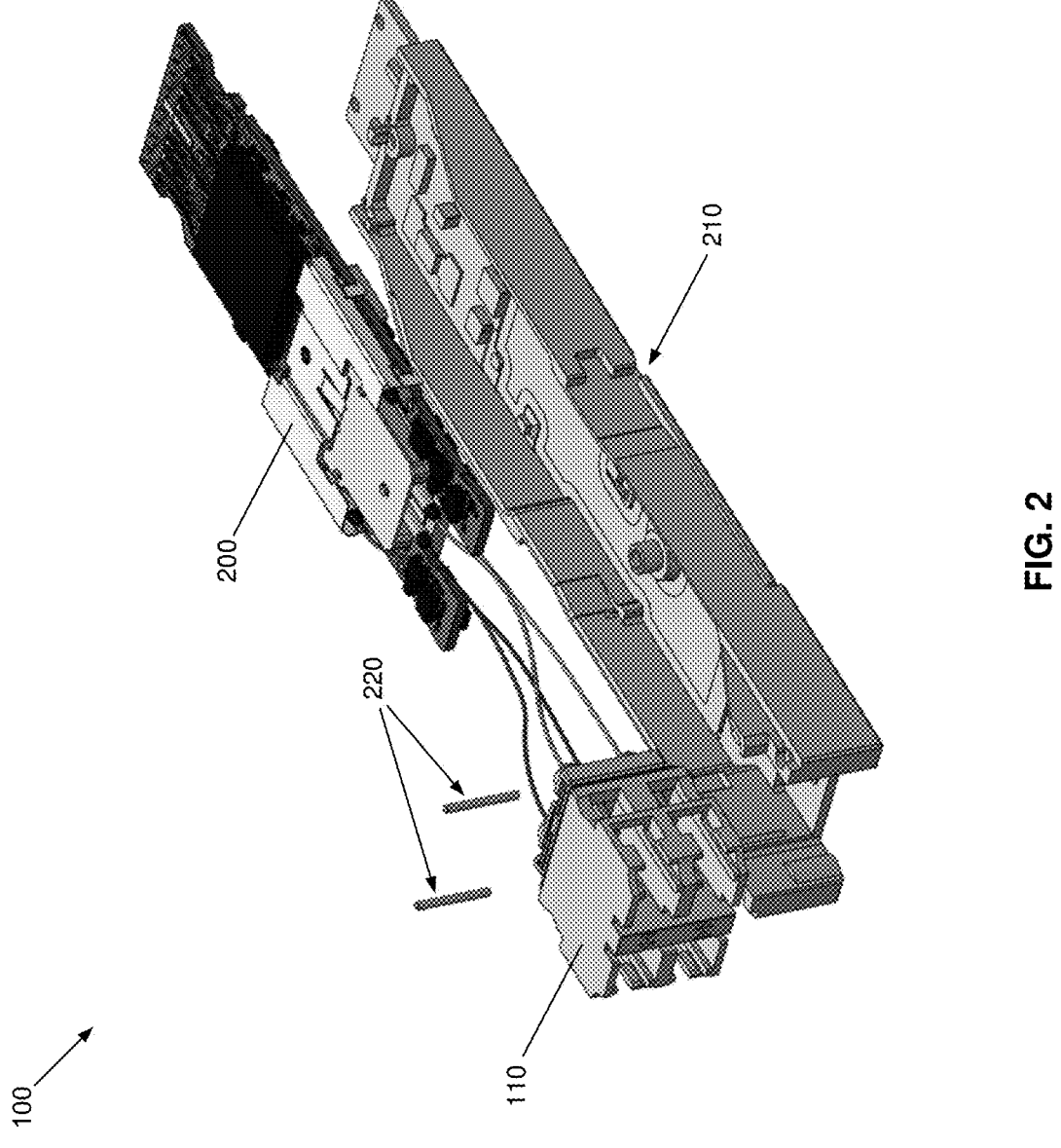
FIG. 2 illustrates an expanded view of an example optical connector with a dual duplex Belly-to-Belly Little Connector (BBLC) block, in accordance with the present disclosure.

FIG. 2 illustrates an expanded view of an example optical connector with a dual duplex Belly-to-Belly Little Connector (BBLC) block, in accordance with the present disclosure. Shown in FIG. 2 is an expanded internal view, including various components, of the optical connector 100 of FIG. 1.

As shown in FIG. 2, the optical connector 100 comprises a core assembly 200 and a bottom housing 210. The core assembly 200 comprises optical transceiver(s) and related circuitry, and may also comprise other circuitry and other components required for providing or facilitating optical based communication. The bottom housing may be configured to engage a corresponding top housing (not shown) to form the housing 120, such as using a clamshell-like based design. The bottom housing 210 may be configured to receive and support the core assembly 200—e.g., by incorporating internal features (ridges, cutouts, etc.).

In accordance with the present disclosure, the optical connector 100 may be configured to incorporate and utilize the BBLC block 110. This may be done, e.g., during assembling of the optical connector 100. In this regard, the BBLC block 110 may be dropped or inserted into the bottom housing 210, which may be configured to receive the BBLC block 110—that is, the bottom housing 210 molded such that it may physically (shape, size, etc.) receive the BBLC block 110. Once inserted, the BBLC block 110 may then be secured, such as using Dowel pins 220, which may line up with and engage corresponding pin holes in the bottom housing 210. Further, the core assembly 200 may be connected to (e.g., via suitable wiring) optical receptacles that are installed within the BBLC block 110. In this regard, as noted above, as illustrated the BBLC block 110 is configured for housing four (4) optical receptacles, in dual duplex arrangement, and are connected to the core assembly 200 to enable operation of the optical receptacles. In this regard, these optical receptacles may be operated and thus function independent of one another. The BBLC block 110 and components thereof, as well installation thereof, are shown and described in more detail in FIGS. 3 and 4.

Figure 3:
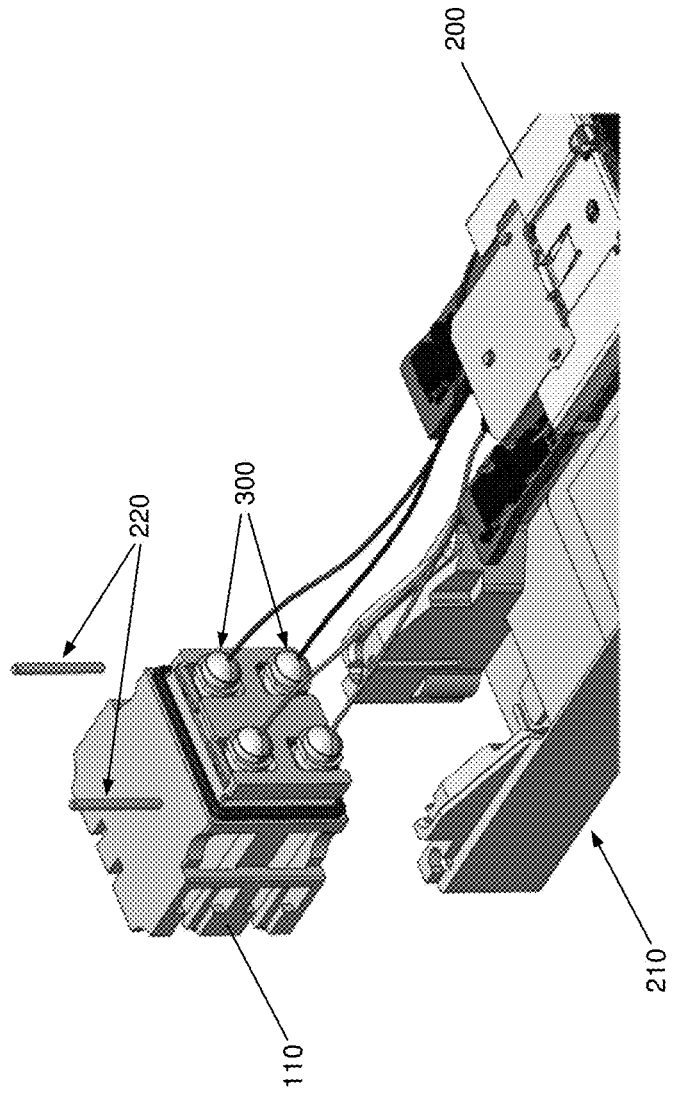
FIG. 3 illustrates an expanded view, from another angle, of an example optical connector with a dual duplex Belly-to-Belly Little Connector (BBLC) block, in accordance with the present disclosure.

FIG. 3 illustrates an expanded view, from another angle, of an example optical connector with a dual duplex Belly-to-Belly Little Connector (BBLC) block, in accordance with the present disclosure. Shown in FIG. 3 is an expanded internal view, including various components, of the optical connector 100 of FIG. 1.

In this regard, FIG. 3 provides a similar view of the optical connector 100 as FIG. 2 but from a different angle—namely from the back. In particular, shown in FIG. 3 is the BBLC block 110 from the back, with four (4) optical receptacles 300 installed therein visible. The optical receptacles 300 are connected (e.g., via fibers, wires, or the like) to the core assembly 200 to facilitate driving and/or operating of the optical receptacles 300 by the optical transceiver(s) of the core assembly 200.

Figure 4:
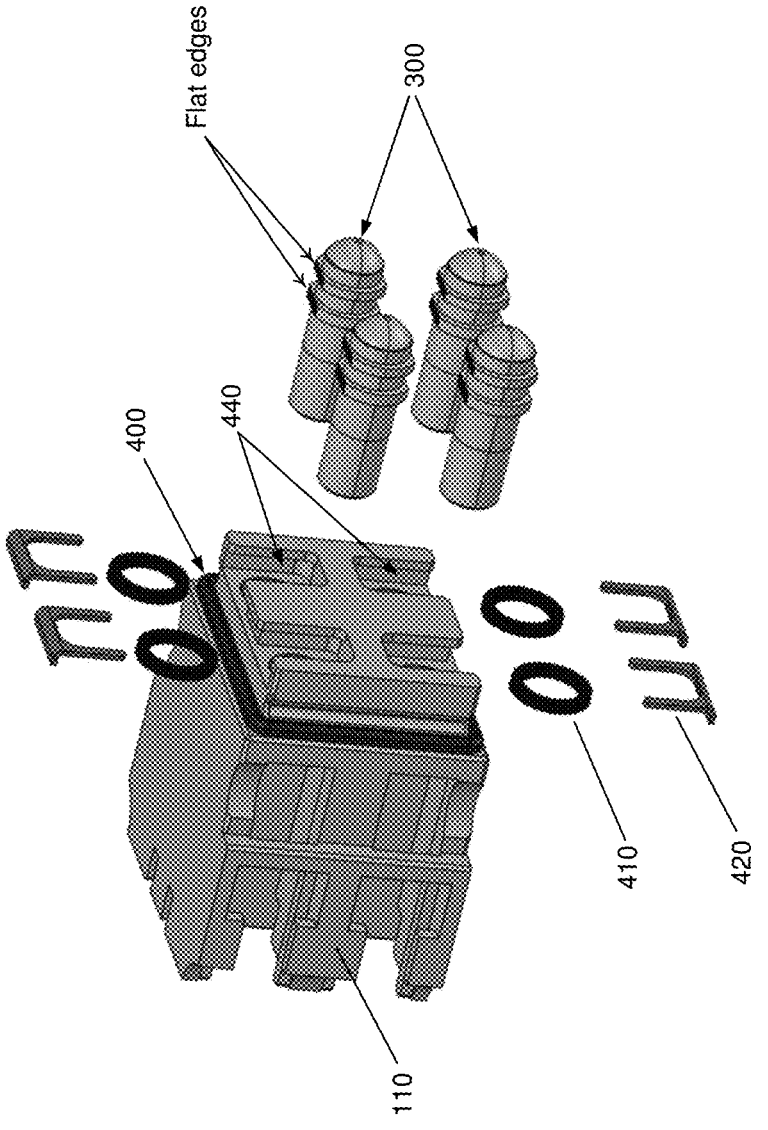
FIG. 4 illustrates an expanded implementation of a dual duplex Belly-to-Belly Little Connector (BBLC) block, showing components and parts associated therewith, in accordance with the present disclosure.

FIG. 4 illustrates an expanded implementation of a dual duplex Belly-to-Belly Little Connector (BBLC) block, showing components and parts associated therewith, in accordance with the present disclosure. Shown in FIG. 4 is the BBLC block 110 of FIG. 1 as well as different components or parts associated therewith, particularly when installing optical receptacles in the BBLC block.

As shown in FIG. 4, the BBLC block 110 is configured for housing four (4) optical receptacles 300, with the different components and parts that may be used when installing these optical receptacles in accordance with an example implementation based on the present disclosure. In particular, as illustrated in FIG. 4, the different components may comprise O-rings 410 and retainers 420. The O-rings 410 may be configured for providing electromagnetic interference (EMI) protection/insulation for the optical receptacles 300 once installed. As such, the O-rings 410 may be designed or selected such that that optimally fit the optical receptacles—e.g., matching size and shape of the bottom end of the optical receptacle, which is the part that is inserted into the BBLC blocks. The retainers 420 may be configured for retaining or securing the optical receptacles 300 in place once installed. In some instances, the optical receptacles may also incorporate features to ensure or otherwise enhance the installation thereof into the BBLC blocks. For example, as shown in the example implementation illustrated in FIG. 4, the optical receptacles 300 may incorporate flat edges that engage flat walls in corresponding receptacle slots 440 in the BBLC block 110.

In some instances, for added EMI shielding, the BBLC block 110 may also incorporate a gasket 400. In this regard, the gasket 400 may be configured such that it would interface with the housing (bottom and top portions) and provide EMI shielding for the BBLC block as a whole.

During example installation, the O-rings 410 are first inserted into the bottom end of the optical receptacles 300, which are then rotated (e.g., right or left, by) 90°, so that the flat edges of the optical receptacles 300 are vertical, so that the optical receptacles 300 may move within the receptacle slots 440. Once inserted, the optical receptacles 300 are rotated again so that that the flat edges are horizontal, and then the retainers 420 are applied to secure the optical receptacles 300 in place. As such, as illustrated in FIG. 4, when the optical receptacles are installed, relative to the two flat edges of the optical receptacles 300, the O-rings 410 will go to the left of both flat edges whereas the retainers 420 will be applied between them.

The use of separate components and/or parts, such as the O-rings and retainers, makes implementations based on the present disclosure flexible as the optical receptacles are removable/replaceable, compared to conventional solutions where the optical receptacles of being glued or otherwise fixed. Such flexibility would allow for replacing or changing the optical receptacles, including individual ones, such as when they become defective or when wanting to switch to different (e.g., improved) ones.

Further, while various example implementations are shown with the BBLC block having four (4) receptacles slots, in dual duplex arrangement, the disclosure is not limited to such implementations. Rather, it should be readily understood that BBLC blocks implemented in accordance with the present disclosure be configured to receive and house any number of optical receptacles. Nonetheless, it may be preferable to house optical receptacles in multiples of two—that is, any number of pairs.

An example Belly-to-Belly Little Connector (BBLC) block for use in optical connectors, in accordance with the present disclosure, comprises a plurality of optical receptacle slots, and one or more removable components or parts configured to engage and secure each optical receptacle installed into corresponding one of the plurality of optical receptacle slots, where the BBLC block is configured for engaging and/or installation into a housing of an optical connector.

In an example embodiment, the one or more removable components or parts comprise an O-ring configured to insulate the optical receptacle once installed within the corresponding one of the plurality of optical receptacle slots.

In an example embodiment, the O-ring comprises an electromagnetic interference (EMI) O-ring.

In an example embodiment, the one or more removable components or parts comprise a retainer configured to retain the optical receptacle in place once installed.

In an example embodiment, the retainer is configured to engage a corresponding feature in the optical receptacle.

In an example embodiment, the retainer is configured to engage and secure the optical receptacle based on movement of the optical receptacle within the corresponding one of the plurality of optical receptacle slots.

In an example embodiment, the Belly-to-Belly Little Connector (BBLC) block further comprises a shielding gasket configured for providing electromagnetic interference (EMI) shielding when the BBLC is installed into the optical connector.

In an example embodiment, the Belly-to-Belly Little Connector (BBLC) block further comprises one or more securing features for securing the BBLC block once installed into the housing.

In an example embodiment, the one or more securing features comprise at least one pin hole configured to engage a corresponding Dowel pin.

In an example embodiment, the plurality of optical receptacle slots is arranged in pairs.

An example optical connector configured for optical communication, in accordance with the present disclosure, comprise one or more housing components configured to enclose other components of the optical connector, a latching component configured for engaging a corresponding optical port, and a Belly-to-Belly Little Connector (BBLC) block configured for housing optical receptacles. The BBLC block comprises a plurality of optical receptacle slots, and one or more removable components or parts configured to engage and secure each optical receptacle installed into corresponding one of the plurality of optical receptacle slots, where the BBLC block is configured for engaging and/or installation into at least one of the one or more housing components.

In an example embodiment, the plurality of optical receptacle slots of the BBLC block is arranged in pairs.

In an example embodiment, the BBLC block further comprises one or more securing features configured for securing the BBLC block once installed into the at least one of the one or more housing components.

In an example embodiment, the one or more securing features comprise at least one pin hole configured to engage a corresponding Dowel pin.

In an example embodiment, the one or more removable components or parts comprise an O-ring configured to insulate the optical receptacle once installed within the corresponding one of the plurality of optical receptacle slots.

In an example embodiment, the one or more removable components or parts comprise a retainer configured to retain the optical receptacle in place once installed.

In an example embodiment, the optical connector further comprises a core assembly that comprises an optical transceiver configured for driving optical receptacles installed in the BBLC block.

In an example embodiment, the optical connector further comprises a heat sink incorporated into at least one of the one or more housing components.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A Belly-to-Belly Little Connector (BBLC) block for use in optical connectors, the BBLC block comprising:
  a plurality of optical receptacle slots; and
  a plurality of removable components or parts configured to engage and secure each optical receptacle installed into a corresponding one of the plurality of optical receptacle slots;
  wherein the BBLC block is configured for engaging and/or installation into a housing of an optical connector;
  wherein the plurality of removable components or parts comprises, for each one optical receptacle slot of the plurality of optical receptacle slots, a corresponding one or more dedicated removable components or parts used for only the one optical receptacle slot;
  wherein the one or more dedicated removable components or parts are configured to enable removing and/or replacing an optical receptacle in each optical receptacle slot individually and/or separately from other optical receptacles in remaining ones of the plurality of optical receptacle slots;
  wherein each optical receptacle slot comprises at least one feature configured to engage an installation feature in an optical receptacle during installation within the optical receptacle slot, when the optical receptacle is in a first position; and
  wherein the plurality of removable components or parts are configured to engage the installation feature, to retain the optical receptacle in place once installed, when the optical receptacle is changed to a second, different position.

2. The Belly-to-Belly Little Connector (BBLC) block of claim 1, wherein the plurality of removable components or parts comprises at least one O-ring configured to insulate an optical receptacle once installed within a corresponding one of the plurality of optical receptacle slots.

3. The Belly-to-Belly Little Connector (BBLC) block of claim 2, wherein the O-ring comprises an electromagnetic interference (EMI)O-ring.

4. The Belly-to-Belly Little Connector (BBLC) block of claim 1, wherein the plurality of removable components or parts comprises at least one retainer configured to retain the optical receptacle in place once installed.

5. The Belly-to-Belly Little Connector (BBLC) block of claim 4, wherein the retainer is configured to engage the installation feature in the optical receptacle.

6. The Belly-to-Belly Little Connector (BBLC) block of claim 4, wherein the retainer is configured to engage and secure the optical receptacle based on movement of the optical receptacle within the corresponding one of the plurality of optical receptacle slots into the second position.

7. The Belly-to-Belly Little Connector (BBLC) block of claim 1, further comprising a shielding gasket configured for providing electromagnetic interference (EMI) shielding when the BBLC is installed into the optical connector.

8. The Belly-to-Belly Little Connector (BBLC) block of claim 1, further comprising one or more securing features for securing the BBLC block once installed into the housing.

9. The Belly-to-Belly Little Connector (BBLC) block of claim 8, wherein the one or more securing features comprise at least one pin hole configured to engage a corresponding pin.

10. The Belly-to-Belly Little Connector (BBLC) block of claim 1, wherein the plurality of optical receptacle slots is arranged in pairs.

11. An optical connector configured for optical communication, the optical connector comprising:
  one or more housing components configured to enclose other components of the optical connector;
  a latching component configured for engaging a corresponding optical port; and
  a Belly-to-Belly Little Connector (BBLC) block configured for housing optical receptacles, the BBLC block comprising:
    a plurality of optical receptacle slots; and
    a plurality of removable components or parts configured to engage and secure each optical receptacle installed into a corresponding one of the plurality of optical receptacle slots;
    wherein the BBLC block is configured for engaging and/or installation into at least one of the one or more housing components;
    wherein the plurality of removable components or parts comprises, for each one optical receptacle slot of the plurality of optical receptacle slots, a corresponding one or more dedicated removable components or parts used for only the one optical receptacle slot;
    wherein the one or more dedicated removable components or parts are configured to enable removing and/or replacing an optical receptacle in each optical receptacle slot individually and/or separately from other optical receptacles in remaining ones of the plurality of optical receptacle slots;
    wherein each optical receptacle slot comprises at least one feature configured to engage an installation feature in an optical receptacle during installation within the optical receptacle slot, when the optical receptacle is in a first position; and
    wherein the plurality of removable components or parts are configured to engage the installation feature, to retain the optical receptacle in place once installed, when the optical receptacle is changed to a second, different position.

12. The optical connector of claim 11, wherein the plurality of optical receptacle slots of the BBLC block is arranged in pairs.

13. The optical connector of claim 11, wherein the BBLC block further comprises one or more securing features configured for securing the BBLC block once installed into the at least one of the one or more housing components.

14. The optical connector of claim 13, wherein the one or more securing features comprise at least one pin hole configured to engage a corresponding pin.

15. The optical connector of claim 11, wherein the plurality of removable components or parts comprises at least one O-ring configured to insulate the optical receptacle once installed within a corresponding one of the plurality of optical receptacle slots.

16. The optical connector of claim 11, wherein the plurality of removable components or parts comprises at least one retainer configured to retain the optical receptacle in place once installed.

17. The optical connector of claim 11, further comprising a core assembly that comprises an optical transceiver configured for driving optical receptacles installed in the BBLC block.

18. The optical connector of claim 11, further comprising a heat sink incorporated into at least one of the one or more housing components.

* * * * *